(12) United States Patent
Arcurio et al.

(10) Patent No.: US 10,851,202 B2
(45) Date of Patent: Dec. 1, 2020

(54) URETHANE-COMPATIBLE POLYESTER ADHESION PROMOTERS

(71) Applicant: SUN CHEMICAL CORPORATION, Parsippany, NJ (US)

(72) Inventors: Ralph Arcurio, Bridgewater, NJ (US); Alex Chudolij, Clifton, NJ (US); Ramasamy Krishnan, North Brunswick, NJ (US); Mark Schneider, Paramus, NJ (US); Paul Hunt, Cheshire (GB); Paul Smales, Newton-le-Willows (GB)

(73) Assignee: Sun Chemical Corporation, Parsippany, NJ (US)

( * ) Notice: Subject to any disclaimer, the term of this patent is extended or adjusted under 35 U.S.C. 154(b) by 465 days.

(21) Appl. No.: 15/112,535

(22) PCT Filed: Jan. 21, 2015

(86) PCT No.: PCT/US2015/012133
§ 371 (c)(1),
(2) Date: Jul. 19, 2016

(87) PCT Pub. No.: WO2015/112528
PCT Pub. Date: Jul. 30, 2015

(65) Prior Publication Data
US 2016/0333142 A1 Nov. 17, 2016

Related U.S. Application Data

(60) Provisional application No. 61/930,051, filed on Jan. 22, 2014, provisional application No. 62/016,135, filed on Jun. 24, 2014.

(51) Int. Cl.
| | | |
|---|---|---|
| C08G 63/199 | (2006.01) | |
| C09D 11/104 | (2014.01) | |
| C08G 63/52 | (2006.01) | |
| C08G 63/54 | (2006.01) | |
| C08G 63/78 | (2006.01) | |

(52) U.S. Cl.
CPC .......... C08G 63/199 (2013.01); C08G 63/52 (2013.01); C08G 63/54 (2013.01); C08G 63/78 (2013.01); C09D 11/104 (2013.01)

(58) Field of Classification Search
CPC .................................................. C08G 63/199
See application file for complete search history.

(56) References Cited

U.S. PATENT DOCUMENTS

| | | |
|---|---|---|
| 5,331,039 A | 7/1994 | Blum et al. |
| 5,637,654 A | 6/1997 | Panandiker et al. |
| 2002/0001677 A1 | 1/2002 | Dumain et al. |
| 2007/0213501 A1* | 9/2007 | Bruchmann ........... C08G 63/20 528/302 |
| 2010/0087617 A1 | 4/2010 | Oyanagi |

FOREIGN PATENT DOCUMENTS

| | | |
|---|---|---|
| WO | WO 2012/028882 A1 | 3/2012 |
| WO | WO 2012/140175 | 10/2012 |

OTHER PUBLICATIONS

European Search Report issued in European Application No. 15740265.2 dated Mar. Jun. 7, 2017.
PCT International Search Report issued in PCT/US2015/012133 dated Apr. 10, 2015.
Written Opinion of International Searching Authority issued in PCT/US2015/12133 dated Apr. 10, 2015.
International Preliminary Report issued in PCT Application No. PCT/US2015/012133, dated Jul. 26, 2016.

* cited by examiner

*Primary Examiner* — Michael F Pepitone
(74) *Attorney, Agent, or Firm* — Marian E. Fundytus; Ostrolenk Faber LLP.

(57) ABSTRACT

The present invention concerns polyester resins of General Formula I (HO—[$R^1R^2C(CH_2$—)]$_a$[—$OCOC_xH_yCO_2$—]$_b$[—$C_pH_zO$—]$_c$—H) or General Formula II (HO—[$R^1R^2C(CH_2$—)$_2$]$_a$[—$OCOC_xH_yCO_2$—]$_b$[—$CH_2CR^3(CO_2H)CH_2O]_d$—H), wherein $R^1$, $R^2$, a, b, c, d, x, y, p, and z are as defined herein, for use in inks and coating compositions. The polyester resins of the present invention are particularly, but not exclusively, suitable to enhance the adhesion between a printing ink or coating composition and a substrate, especially a plastic substrate, to which it is applied. The polyester adhesion promoters of the invention are compatible with urethane-based inks and coating compositions.

26 Claims, No Drawings

URETHANE-COMPATIBLE POLYESTER ADHESION PROMOTERS

CROSS REFERENCE TO RELATED APPLICATIONS

The present application is a § 371 National Phase application based on PCT/US2015/012133 filed Jan. 21, 2015, which claims the benefit of U.S. Provisional Application Nos. 61/930,051 filed Jan. 22, 2014 and 62/016,135 filed Jun. 24, 2014, the subject matter of each of which is incorporated herein by reference in their entirety.

FIELD OF THE INVENTION

The present invention concerns adhesion promoting compounds for use in inks and coating compositions, in particular, but not exclusively, to enhance the adhesion between a printing ink or coating composition and a substrate, especially a plastic substrate, to which it is applied.

BACKGROUND

Adhesion promoting compounds are used in commercial ink formulations in order to enhance the adhesion between the ink and the substrate onto which it is printed. Failure of adhesion leads to difficulties in the printing process or inadvertent removal of the printed ink film. Printing of plastics food packaging is widespread and it is particularly important in such applications that the printed ink remains on the packaging and that parts of the ink composition do not contaminate the product.

Adhesion promoters based upon organometallic compounds, containing for example titanium or zirconium, have been known and used commercially for many years. For example, WO 2005/049,622 discloses adhesion promoters obtained by reacting at least one metal complex and at least one alkyl phosphate. Organo-titanium adhesion promoters are described in WO 2012/028,882, WO 2005/097,919 and U.S. Pat. No. 7,619,021. While providing good adhesion between the ink and substrate, simple titanium compounds such as titanium alkoxides have tended to impart undesirable yellow color to the ink.

Organo titanates are widely used as crosslinkers for hydroxy-functional polymers (resins). When the resin is applied to a substrate and dried, crosslinking occurs via a condensation reaction between titanium alkoxy groups and polymer hydroxyls, resulting in the elimination of alcohol. The organo titanates improve adhesion to the substrate and may also enhance resistance properties of the coating (water, heat, solvent resistance, etc.). For some coatings applications a stable one-component system can be formulated by incorporating alcohols in the solvent system to moderate the crosslinking action of the organo titanate. The presence of alcohol suppresses these crosslinking reactions in the liquid formulation, and thus stabilizes viscosity (e.g. in nitrocellulose based printing inks and varnishes). In some applications, however, the addition of alcohol to the solvent is either undesirable (when VOC levels must remain low) or impractical due to incompatibility with solvents or polymers in the formulation.

Thus, there is a need in the art to find alternative adhesion promoters for use in printing inks and coatings.

SUMMARY OF THE INVENTION

In one aspect, the present invention provides a hydroxyl-functional polyester resin according to General Formula I:

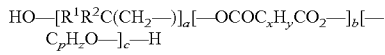

wherein:
$R^1$, and $R^2$ are each independently selected from the group consisting of H, $C_1$-$C_4$alkyl, and —$CH_2OH$;
x is an integer 1 through 10;
y is an integer 2 through 20;
p is an integer 2 through 8;
z is two times p;
each $C_xH_y$ and $C_pH_z$ are each independently linear or branched alkyl, optionally comprising an aromatic, or saturated or unsaturated alicyclic ring;
a, b, and c are each independently an integer 1 through 100; provided that b<a+c;
the $M_w$ is less than about 10,000;
the Tg is less than about 5° C.;
the hydroxyl value is about 225-300; and
wherein the polyester resin is formed by the reaction of one or more unsaturated condensation polymers produced by a reaction of dibasic organic acids, one or more organic compounds with multiple functional groups, and one or more polyols.

In another aspect, the present invention provides a hydroxyl- and carboxy-functional polyester resin of the General Formula II:

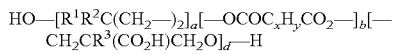

wherein:
$R^1$, $R^2$, and $R^3$ are each independently selected from the group consisting of H, $C_1$-$C_4$alkyl, and —$CH_2OH$;
x is an integer 1 through 10;
y is an integer 2 through 20;
each $C_xH_y$ is independently linear or branched alkyl, optionally comprising an aromatic, or saturated or unsaturated alicyclic ring;
a, b, and d are each independently an integer 1 through 100; provided that b>a+d;
the $M_w$ is less than about 10,000;
the Tg is less than about 5° C.;
the hydroxyl value is about 225-290;
the acid value is about 75-100; and
wherein the polyester resin is formed by the reaction of one or more unsaturated condensation polymers produced by a reaction of dibasic organic acids, one or more organic compounds with multiple functional groups, and one or more polyols.

In certain embodiments, at least one of $R^1$ and $R^2$ of the General Formula I is methyl.
In certain embodiments, at least one of $R^1$ and $R^2$ of the General Formula I is —$CH_2OH$.
In other embodiments, one of $R^1$ and $R^2$ of the General Formula I is methyl, and the other is —$CH_2OH$.
In certain embodiments, at least one of $R^1$, $R^2$, and $R^3$ of General Formula II is methyl.
In other embodiments, at least one of $R^1$, $R^2$, and $R^3$ of the General Formula II is —$CH_2OH$.
In another embodiment, at least one of $R^1$, $R^2$, and $R^3$ of General Formula II is methyl, and at least one of $R^1$, $R^2$, and $R^3$ is —$CH_2OH$.
In certain embodiments, x is 6.
In certain embodiments y is 2-10.

In other embodiments, y is 8 or 10.

In certain embodiments of the polyester resin of General Formula I, p is 4.

In certain embodiments of the polyester resin of General Formula I, z is 8.

In certain embodiments of the polyester resin of General Formula I, a, b, and c may be combined in any ratios such as to give the preferred molecular weight, Tg, and hydroxyl value of the final polyester polymer resin of General Formula I.

In certain embodiments of the polyester resin of General Formula I, the ratio a:c is between about 1:2 and about 1:4.

In other embodiments of the polyester resin of General Formula I, the ratio a:c is about 3:7.

In certain embodiments of General Formula I, the hydroxyl value is about 290.

In certain embodiments, a, b, and d may be combined in any ratios such as to give the preferred molecular weight, Tg, acid value and hydroxyl value of the final polyester polymer resin of General Formula II.

In certain embodiments of the polyester resin of General Formula II, the ratio a:d is between about 1:2 and about 1:4.

In other embodiments of the polyester resin of General Formula II, the ratio a:d is about 3:7.

In certain embodiments of the polyester resin of General Formula II, the hydroxyl value is about 250.

In certain embodiments of the polyester resin of General Formula II, the acid value is about 85.

In certain embodiments of the polyester resin of General Formula I, the ratio of the total concentration of hydroxyl moieties in the combined starting materials to the total concentration of the carboxylic acid moieties is between about 1.5:1 and about 2.0:1.

In certain embodiments of the polyester resin of General Formula I, the ratio of the total concentration of hydroxyl moieties in the combined starting materials to the total concentration of the carboxylic acid moieties is about 1.75:1.

In certain embodiments, the dibasic organic acids are selected from the group consisting of a phthalic acid and a maleic acid.

In other embodiments, the dibasic organic acid is tetrahydrophthalic acid.

In certain embodiments, the polyols are glycols.

In certain embodiments, the $M_w$ of the polyester resin is less than about 8,000.

In other embodiments, the $M_w$ of the polyester resin is less than about 5,000.

In other embodiments, the $M_w$ of the polyester resin is less than about 1,000.

In certain embodiments, the Tg of the polyester resin is less than about 3° C.

In other embodiments, the Tg of the polyester resin is less than about 1° C.

In other embodiments, the Tg of the polyester resin is less than about 0° C.

In a certain aspect, the present invention provides a printing ink or coating composition comprising a polyester resin of General Formula I or General Formula II.

In certain embodiments of the printing ink or coating composition, the polyester resin is present in an amount of from about 0.1 to about 10%.

In other embodiments of the printing ink or coating composition, the polyester resin is present in an amount of from about 0.1 to about 5%.

In certain embodiments of the printing ink or coating composition, the polyester resin is present in an amount of from about 10.1 to about 35%.

In certain embodiments, the ink or coating composition comprises a polyurethane.

In other embodiments, the ink or coating composition comprises a polyurethane in combination with other polymeric binders.

In certain embodiments of the printing ink or coating composition, the polyurethane is the predominant resin.

In certain embodiments, the printing ink or coating composition further comprises a colorant.

In a certain aspect, the present invention provides a method of making a polyester resin of any one of General Formula I or General Formula II, comprising reacting one or more unsaturated condensation polymers produced by a reaction of dibasic organic acids, one or more organic compounds with multiple functional groups, and one or more polyols.

DETAILED DESCRIPTION OF THE INVENTION

It is to be understood that the foregoing general description and the following detailed description are exemplary and explanatory only, and are not restrictive of any subject matter claimed.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety for any purpose.

In this application, the use of the singular includes the plural unless specifically stated otherwise. As used herein, the singular forms "a," "an" and "the" are intended to include the plural forms as well, unless the context clearly indicates otherwise.

In this application, the use of "or" means "and/or" unless stated otherwise.

As used herein, the terms "comprises" and/or "comprising" specify the presence of the stated features, integers, steps, operations, elements, and/or components, but do not preclude the presence or addition of one or more other features, integers, steps, operations, elements, components, and/or groups thereof. Furthermore, to the extent that the terms "includes," "having," "has," "with," "composed," "comprised" or variants thereof are used in either the detailed description or the claims, such terms are intended to be inclusive in a manner similar to the term "comprising."

As used herein, ranges and amounts can be expressed as "about" a particular value or range. "About" is intended to also include the exact amount. Hence "about 5 percent" means "about 5 percent" and also "5 percent." "About" means within typical experimental error for the application or purpose intended.

As used herein, "multifunctional" means having two or more functional groups. A multifunctional monomer, e.g., can be a di-functional, tri-functional, tetra-functional or have a higher number of functional groups.

Throughout this disclosure, all parts and percentages are by weight (wt % or mass % based on the total weight) and all temperatures are in ° C. unless otherwise indicated.

As used herein, molecular weight ($M_w$) refers to weight-average molecular weight, unless specified otherwise.

The prior art typically requires introduction of at least two different components (or mixture thereof) to be introduced as an adhesion promoter to an ink or coating in order to achieve improved adhesion between ink and substrate. It is known in the art to use polyester materials in printing inks and coatings, but they are primarily used as film formers and not as adhesion promoters. There are many different types of polyesters with varying physical properties known in the art, but they typically have a weight-average molecular weight (Mw) greater than 10,000 and a glass transition temperature (Tg) well above 5° C. The polyesters of the present invention are novel in that they have a Mw below about 10,000, and a Tg below about 5° C., and are therefore suitable for use as adhesion promoters.

The polyester resins of the present invention are also novel because they have high acid and hydroxyl values. Commercially available polyester resins specifically used for printed inks and coatings, adhesion to PET substrates, and designed to be compatible with urethanes, have low acid values.

Commercially available polyester resins typically have very low acid values, ranging from about 0.2 to a maximum of about 100. For example, the RU series of polyester resins from Procachem, designed specifically for use with polyurethanes, have acid values ranging from 0.25 to 1.0. Conversely, the Applicants have now surprisingly found that the polyester resins of the invention, having acid values equal to or greater than 225 are compatible with urethanes, work well as adhesion promoters, and work well in printed inks and coatings.

Commercially available polyester resins typically have low hydroxyl values when used in printed inks and coatings, and when designed to be compatible with urethanes. For example, the EBECRYL series of polyester resins from Allnex, designed specifically for inks, have a maximum hydroxyl value of 120. The RU series of polyester resins from Procachem, designed specifically for use with polyurethanes, have a maximum hydroxyl value of 112. In addition, the ESPEL polyester resins from Hitachi Chemical, designed as PET film adhesives, have a maximum hydroxyl value of about 25. Conversely, Applicants have now surprisingly found that polyester resins with a minimum hydroxyl value of 225 are compatible with urethanes, and work well when used in printed inks and coatings.

In addition, commercially available polyester resins having relatively higher hydroxyl values typically have very low acid values. For example, P-520, P-1020, and P-1012 from Kuraray, having hydroxyl values over 100, have acid values of <0.5. Conversely, Applicants have now surprisingly found that polyester resins that have both a high hydroxyl value and a high acid value are compatible with urethanes, and work well when used in printed inks and coatings.

These inventive materials can be used in printing inks and coatings as a film former in larger quantities (preferably >5%, more preferably >10%), or as an adhesion promoter in smaller quantities (preferably <5%). The use of the polyesters of the present invention in a printing ink or coating allows the formulator to eliminate other types of adhesion promoters, especially organo titanium types, which are known to cause undesirable yellowing in ink and coating films. The polyesters of the present invention can serve as adhesion promoters that can be introduced as a single component (eliminating the need for combining with an organo titanium of any kind) to provide a simple, efficient and effective means of imparting immediate adhesion improvement. The polyesters of the present invention could also be used in combination with other adhesion promoters (organo titanium types as well as others). The novel chemistry of the present invention allows it to be rich in hydroxyl and carboxyl groups and low enough in molecular weight to anchor to the substrate, sufficiently compatible in common printing ink solvents and impart required performance properties. Elimination of a titanium compound prevents a common source of yellowing and does not adversely affect viscosity or ink stability. In a preferred embodiment the polyesters of the present invention would be compatible with polyurethanes and thus the polyesters could be incorporated into polyurethane-based inks to enhance adhesion and storage stability. But the polyesters of the present invention could also be incorporated into other polymeric binders and/or blends of polymeric binders.

In one aspect, the present invention provides a novel polyester resin according to General Formula I:

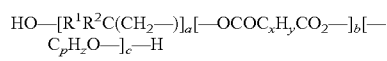

wherein:
$R^1$, and $R^2$ are each independently selected from the group consisting of H, $C_1$-$C_4$alkyl, and —$CH_2OH$;
x is an integer 1 through 10;
y is an integer 2 through 20;
p is an integer 2 through 8;
z is two times p;
each $C_xH_y$ and $C_pH_z$ are each independently linear or branched alkyl, optionally comprising an aromatic, or saturated or unsaturated alicyclic ring;
a, b, and c are each independently an integer 1 through 100; provided that b<a+c.
the $M_w$ is less than about 10,000;
the Tg is less than about 5° C.;
the hydroxyl value is about 225-300; and
wherein the polyester resin is formed by the reaction of one or more unsaturated condensation polymers produced by a reaction of dibasic organic acids, one or more organic compounds with multiple functional groups, and one or more polyols.

In another aspect, the present invention provides a polyester resin of the General Formula II:

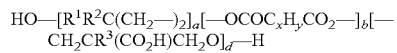

wherein:
$R^1$, $R^2$, and $R^3$ are each independently selected from the group consisting of H, $C_1$-$C_4$alkyl, and —$CH_2OH$;
x is an integer 1 through 10;
y is an integer 2 through 20;
each $C_xH_y$ is independently linear or branched alkyl, optionally comprising an aromatic, or saturated or unsaturated alicyclic ring;
a, b, and d are each independently an integer 1 through 100; provided that b>a+d;
the $M_w$ is less than about 10,000;
the Tg is less than about 5° C.;
the hydroxyl value is about 225-290;
the acid value is about 75-100; and
wherein the polyester resin is formed by the reaction of one or more unsaturated condensation polymers produced by a reaction of dibasic organic acids, one or more organic compounds with multiple functional groups, and one or more polyols.

The cost of the adhesion promoters of the present invention is less than that of titanate-type adhesion promoters. Low in-formula concentrations provide effective adhesion improvement, allowing the current invention to be used at low levels as an additive, but only at the low cost of a conventional resin. The adhesion promoters of the present invention maintain lower ink viscosities with improved storage and running stabilities. Lower ink viscosities are advantageous as they allow for increased formulating latitude (e.g. inks/coatings with higher solids and thus lower VOC emissions).

The present application is drawn to an adhesion promoter with improved properties. According to the present invention, an adhesion promoter for improving the adhesion of a coating composition to a substrate, and more specifically for the purpose of improving adhesion of a liquid printing ink or coating to various polyester-type substrates, is comprised of reacting dibasic organic acids with polyols to form unsaturated polyester resins. The present invention further comprises printing inks and coatings comprising the inventive adhesion promoters. The adhesion promoter is an unsaturated resin formed by the reaction of dibasic organic acids (such as phthalic and maleic acid), organic compounds (with multiple functional groups) and polyols (such as glycols). The resulting polyester is a thermosetting resin whose characteristics depend on the amount and types of unsaturated species and additives introduced during the polymerization process to generate free radicals at unsaturated bonds and propagate via chain reaction to other unsaturated bonds in adjacent molecules, linking them in the process.

Careful control of synthesis conditions and feedstock enables limiting molecular weight and optimization of reactive groups critical to imparting functional adhesion promoting properties as well as system compatibility.

According to a further aspect of the invention, we provide a printing ink or coating comprising: a) a polymeric binder, preferably a polyurethane but examples of other polymeric binders include polyamides, acrylics, epoxies, rosins, rosin esters, nitrocellulose, and the like and combinations thereof; b) solvent for the polymeric binder, such as for example alcohols (for example methyl alcohol, ethyl alcohol, isopropyl alcohol, N-propyl alcohol, N-butyl alcohol, amyl alcohol, and the like); glycols and glycol ethers (for example ethylene glycol, diethylene glycol, N-propyl glycol, isopropyl glycol, N-butyl glycol, methoxy propanol, ethoxy propanol, diacetone alcohol, methoxy butanol, and the like); esters (for example methyl acetate, ethyl acetate, isopropyl acetate, N-propyl acetate, propylene glycol monomethyl ether acetate, butyl acetate, methoxy propyl acetate, ethyl-3-ethoxy-propanol, ethyl lactate, and the like); aromatics (for example benzene, toluene, and the like); aliphatics (for example cyclohexane, heptane, and the like; ketones, for example methyl ethyl ketone, cyclohexanone, isophorone, and the like); ethers (for example tetrahydrofuran, and the like); and water; and combinations thereof; and c) adhesion promoting resin synthesized by reacting dibasic organic acids with polyols to form polymers that are polyesters of General Formulae I and II (above), wherein the polyesters have a $M_w$ below about 10,000, and a Tg below about 5° C. The resultant printing inks and coatings exhibit improved adhesion to a variety of substrates, especially polymeric substrates including but not limited to polyesters, polyethylenes, polypropylenes, polyamides and other polyolefin substrates without requiring any added free radical "catalyst" or other adjunct synergist. The use of the novel adhesion promoting resins of the present invention is not limited to any particular ink type or ink chemistry and could have potential application in virtually any ink system in which they are compatible. This includes for example flexographic, gravure, lithographic, screen, ink jet, etc.

The inks may contain colorants. Suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

Alternatively, the coating composition may be free of colorants.

The printing ink or coating composition may also include waxes such as, but not limited to, amide wax, erucamide wax, polypropylene wax, paraffin wax, polyethylene wax, teflon, carnuba wax and the like. The wax may be a combination of waxes.

As with most printing inks and coating compositions, additives may be incorporated to enhance various properties. A partial list of such additives includes, but is not limited to, prior art adhesion promoters, light stabilizers, de-gassing additives, flow promoters, defoamers, antioxidants, stabilizers, surfactants, dispersants, plasticizers, rheological additives, waxes, silicones, etc.

Potential applicability of the present invention is widespread as polyester substrates are commonly used in general food packaging applications including flexible pouches, container lids, snack packs, barrier films, etc., where there is a need for applying printing ink on the substrate, but adhesion to the polyester film poses a greater challenge than on many other flexible packaging films.

The resin design of the adhesion promoters of the present invention are novel due to the low Mw with high hydroxyl and carboxyl functionality, and low Tg. The result is preferably a single resin/one component adhesion promoter that improves adhesion without the detrimental effects often encountered with prior art adhesion promoters, such as yellowing of the applied ink or coating, or the tendency of organo titanates to undergo crosslinking reactions while in storage or while being mixed together with very reactive polymers.

When used as adhesion promoters only, and not as film formers, the resins of the present invention are used in an amount <10%, and preferably <5%.

As previously mentioned, the inventive polyester resins of the present invention can also be used in printing inks and coatings as a film former in larger quantities, preferably >5%, more preferably >10%, more preferably 10-40%, and most preferably 10-30%, which eliminates the need for additional adhesion promoters and provides printing inks and/or coatings that adhere to a wide variety of films, especially polymeric substrates, including but not limited to polyesters, polyolefins, polyamides, and PET. The polyester resins can be used in ink systems suitable for flexographic, gravure, lithographic, screen, ink jet, etc. while exhibiting enhanced water resistance and outdoor durability results.

Potential applicability of the present invention is widespread as "difficult" filmic surfaces are encountered in general food packaging applications, including polyester film.

Inks containing the polyester resin were compared directly to inks without this resin but containing a standard adhesion promoter. If this polyester resin is added to inks containing a standard adhesion promoter, instability of the ink may occur on increasing levels of addition above 5%. With the use of standard adhesion promoters, compatibility is limited so that viscosity increase (instability) may occur, especially at higher levels. Thus, a key benefit of using the polyester resins of the present invention is that a polyester resin used as an adhesion promoter, that can also be a system resin to impart desired properties, and that does not adversely affect stability, can be used without the addition of standard adhesion promoters that may negatively affect stability.

EXAMPLES

The following examples illustrate specific aspects of the present invention and are not intended to limit the scope thereof in any respect and should not be so construed.

General Synthetic Methods.

The reactor was thoroughly purged and cleaned, and components (A), (B), and (C) (as described below) were added. The reactor was then purged with nitrogen and the temperature was increased to about 170° C. over 1 to 2 hours. The temperature was slowly increased to about 180 to 220° C. The reaction was continued at that temperature until the acid value was below 10. Component (E) was slowly added over 10-15 minutes while bubbling nitrogen through the batch, as the mixture was cooled to about 150° C. Then component (F) as added to yield the final product.

Polymer Synthesis Examples

A novel hydroxyl functional polyester (Example 1) and a novel hydroxyl/carboxyl functional polyester (Example 2) were synthesized as follows:

Example 1: Solvent-Based Hydroxyl Functional Polyester Formula

|   | Material | % |
|---|---|---|
| A | Trimethylol Propane | 25.7% |
| B | 1,4 Butanediol | 12.3% |
| C | Tetrahydrophthalic Anhydride | 36.8% |
| D | Water-decanted from condensation polymerization | −4.8% |
| E | n-Propyl Acetate | 6.0% |
| F | n-Propanol | 24.0% |
|   | Total | 100.0 |

After the reactor was thoroughly purged and cleaned, components (A), (B), and (C) were added. The reactor was purged with nitrogen and the temperature was increased to 185° C. over 2 hours. The temperature was slowly increased to 220° C. The reaction was continued at that temperature until the acid value was 6. Component (E) was slowly added over 15 minutes while bubbling nitrogen through the batch, as the mixture was cooled to 150° C. Then component (F) was added to yield the final product.

Solids=70.05%

Tg=−5.42° C.

Hydroxyl value=290

$M_w$=4,555

Example 2: Solvent-Based Hydroxyl & Carboxyl Functional Polyester Formula

|   | Material | % |
|---|---|---|
| A | Trimethylol Propane | 23.58 |
| B | Dimethylolpropionic Acid | 16.83 |
| C | Tetrahydrophthalic Anhydride | 33.75 |
| D | Water-decanted from condensation polymerization | −4.16 |
| E | n-Propyl Acetate | 6.0 |
| F | n-Propanol | 24.0 |
|   | Total | 100.0 |

After the reactor was thoroughly purged and cleaned, components (A), (B), and (C) were added. The reactor was purged with nitrogen and the temperature was increased to 170° C. over 2 hours. The temperature was slowly increased to 181° C. The reaction was continued at that temperature until the acid value was 92. The mixture was then cooled to 150° C. As the mixture was cooling, the acid value decreased to 84.5. Component (E) was added slowly over 15 minutes while bubbling nitrogen through the batch, as the mixture was cooled to 150° C. Then component (F) was added to yield the final product.

Solids=70.5%

Tg=−1.18° C.

Acid value=84.5

Hydroxyl value=250

$M_w$=853

General Test Methods.

Glass transition temperature (Tg) was measured using a TA Instruments Q2000 Differential Scanning Calorimeter (DSC).

Weight-average molecular weight ($M_w$) was determined using Gel Permeation Chromatography. Protocol as follows: 125+25 mg of sample solids were weighed out into a 4 dram vial. Any solvent was removed by drying in an oven or gentle heating under a stream of nitrogen. 10 mL of tetrahydrofuran (THF) was added to the vial, and the vial was shaken to promote dissolution. Data were analyzed with Waters software (Waters Empower 2 (feature release 5)), and the sample type for each sample injection was set to Broad Unknown. The molecular weight averages of the samples were calculated using Waters software.

The sample was then dissolved in mobile phase, and allowed to stand for a minimum of twelve hours prior to analysis, under refrigeration. The sample solution was injected via auto-sampler onto a column set that was calibrated with narrow-MWD polystyrene standards. Sample elution was monitored with a refractive index detector. The profile was then digitally sliced with software to permit the calculation of molecular weight averages. Although a refractive index detector was used here, it is well-known to one of skill in the art that light scattering and viscometer detectors could also be used.

Finished Ink Examples Using the Polyesters of the Present Invention as an Adhesion Promoter Example 3A (Comparative): Solimax AP—Black (HSAQ-90002)—Sun Chemical Corporation (containing over 10% of a urethane)

Example 3B (Inventive): Same as 3A with a 3% addition of Example 2 polyester adhesion promoter Example 3C (Inventive): Same as 3A with a 3% addition of Example 1 adhesion promoter
General Test Method for Adhesion Evaluation for Example 3A-3C:

All inks were printed using a K-Laboratory Control Coater Model 30-01 (Testing Machines Inc.) with a #3 Meyer Bar at #7 speed setting. Application viscosity was adjusted to about 35 centipoise (cps), as measured using a Viscolite 700 mechanical resonance viscometer by Hydramotion, Ltd. Ink coated film was subsequently dried in a convection oven for 15 sec. at 50° C. and/or at ambient conditions.
Adhesion Test:

Manual pull of Scotch 610 adhesive test tape (slow, followed by fast pull) in a direction perpendicular to the surface of the print.
Rating:

Prints were evaluated visually to determine the amount of ink removed by the tape. Results were comparative and expressed as one of the following:
- Equal—no visual discernible difference in ink removal (compared to the comparative Example 3A)
- Slight improvement—approx. 10-15% reduction of ink removal
- Moderate improvement—approx. 16-25% reduction of ink removal
- Marked improvement—greater than approx. 25% reduction of ink removal Inks 3A and 3B were printed on 48 LBT (corona treated clear uncoated transparent polyester film—DuPont Teijin Films) and assessed for adhesion.
Results:

Performance of ink 3B compared to ink 3A showed that addition of 3% Example 2 adhesion promoter exhibits moderately improved adhesion.

Inks 3A and 3C were printed on 48LBT, M34 Mylar (PVdC coated clear polyester film—DuPont Teijin Films) and Melinex 813 PET (one side pre-treated polyester film substrates—DuPont Teijin Films).
Results:

The performance of ink 3C compared to ink 3A was as follows:
- 48 LBT—Adhesion was very good with and without adhesion promoter but slightly improved with the addition of 3% Example 1 adhesion promoter.
- M34 Mylar—Addition of 3% Example 1 adhesion promoter markedly improves adhesion in both ambient as well as oven dry (15 sec. at 50° C.) conditions.
- Melinex 813 PET—equally good adhesion with either ink.

Viscosity of Examples 3B and # c remained stable, and gloss (also a potential indicator of compatibility/stability) was equal to or slightly better after the polyester addition.

The present invention has been described in detail, including the preferred embodiments thereof. However, it will be appreciated that those skilled in the art, upon consideration of the present disclosure, may make modifications and/or improvements on this invention that fall within the scope and spirit of the invention.

What is claimed:

1. A polyester resin according to General Formula I:

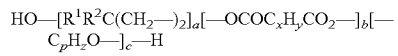

wherein:
$R^1$ and $R^2$ are each independently selected from the group consisting of H, $C_1$-$C_4$alkyl, and —$CH_2OH$;
x is an integer 1 through 10;
y is an integer 2 through 20;
p is an integer 2 through 8;
z is two times p;
each $C_xH_y$ and $C_pH_z$ are each independently linear or branched alkyl, optionally comprising an aromatic, or saturated or unsaturated alicyclic ring;
a, b, and c are each independently an integer 1 through 100; provided that b<a+c;
the $M_w$ is less than 10,000;
the Tg is less than 5° C.;
the hydroxyl value is 225-300; and
wherein the polyester resin is produced by a reaction of dibasic organic acids, one or more organic compounds with multiple functional groups, and one or more polyols.

2. A polyester resin of the General Formula II:

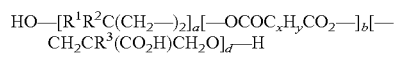

wherein:
$R^1$, $R^2$, and $R^3$ are each independently selected from the group consisting of H, $C_1$-$C_4$alkyl, and —$CH_2OH$;
x is an integer 1 through 10;
y is an integer 2 through 20;
each $C_xH_y$ is independently linear or branched alkyl, optionally comprising an aromatic, or saturated or unsaturated alicyclic ring;
a, b, and d are each independently an integer 1 through 100; provided that b>a+d;
the $M_w$ is less than 10,000;
the Tg is less than 5° C.;
the hydroxyl value is 225-290;
the acid value is 75-100; and
wherein the polyester resin is produced by a reaction of dibasic organic acids, one or more organic compounds with multiple functional groups, and one or more polyols.

3. The polyester resin of claim 1, wherein at least one of $R^1$ and $R^2$ is methyl or —$CH_2OH$.

4. The polyester resin of claim 1, wherein one of $R^1$ and $R^2$ is methyl, and the other is —$CH_2OH$.

5. The polyester resin of claim 2, wherein at least one of $R^1$, $R^2$, and $R^3$ is methyl or —$CH_2OH$.

6. The polyester resin of claim 2, wherein at least one of $R^1$, $R^2$, and $R^3$ is methyl, and at least one of $R^1$, $R^2$, and $R^3$ is —$CH_2OH$.

7. The polyester resin of claim 1, wherein x is 6, y is 2-10, p is 4 and z is 8.

8. The polyester resin of claim 1, wherein y is 8 or 10.

9. The polyester resin of claim 1, wherein the hydroxyl value is 290 or 250.

10. The polyester resin of claim 1, wherein the ratio a:c is between 1:2 and 1:4.

11. The polyester resin of claim 1, wherein the ratio a:c is 3:7.

12. The polyester resin of claim 2, wherein the acid value is 85.

13. The polyester resin of claim 2, wherein the ratio a:d is between 1:2 and 1:4.

14. The polyester resin of claim 2, wherein the ratio a:d is 3:7.

15. The polyester resin of claim 1, wherein the ratio of the total concentration of hydroxyl moieties in the combined starting materials to the total concentration of the carboxylic acid moieties is between 1.5:1 and 2.0:1.

16. The polyester resin of claim 1, wherein the dibasic organic acids are selected from the group consisting of a phthalic acid, a maleic acid and tetrahydrophthalic acid.

17. The polyester resin of claim 1, wherein the polyols are glycols.

18. The polyester resin of claim 1, wherein the $M_w$ is less than 8,000, less than 5,000 or less than 1,000.

19. The polyester resin of claim 1, wherein the Tg is less than 3° C., is less than 1° C. or less than 0° C.

20. A printing ink or coating composition comprising the polyester resin of claim 1.

21. The printing ink or coating composition of claim 20, wherein the polyester resin is present in an amount of from 0.1 to 10% or from 0.1 to 5%.

22. The printing ink or coating composition of claim 20, wherein the polyester resin is present in an amount of from 10.1 to 35%.

23. The printing ink or coating composition of claim 20, wherein the ink or coating composition comprises a polyurethane or a polyurethane in combination with other polymeric binders.

24. The printing ink or coating composition of claim 23, wherein the polyurethane is the predominant resin.

25. The printing ink or coating composition of claim 20, further comprising a colorant.

26. A method of making a polyester resin of claim 1, comprising reacting one or more unsaturated condensation polymers produced by a reaction of dibasic organic acids, one or more organic compounds with multiple functional groups, and one or more polyols.

* * * * *